US007681446B2

(12) United States Patent
Morimoto et al.

(10) Patent No.: US 7,681,446 B2
(45) Date of Patent: Mar. 23, 2010

(54) LIQUID CONTAINER (75) Inventors: Hideki Morimoto, Osaka (JP);
Noriyuki Nakagawa, Osaka (JP);
Yoshihiro Iwamoto, Osaka (JP)

(73) Assignee: ALLGO Corp., Osaka (JP)

( * ) Notice: Subject to any disclaimer, the term of this patent is extended or adjusted under 35 U.S.C. 154(b) by 0 days.

(21) Appl. No.: 11/998,235

(22) Filed: Nov. 29, 2007

(65) Prior Publication Data
US 2009/0139324 A1 Jun. 4, 2009

(51) Int. Cl.
*G01F 23/00* (2006.01)
(52) U.S. Cl. ........................................................ 73/292
(58) Field of Classification Search ............... 73/290 R, 73/290 V, 292, 304 C, 304 R, 429, 862.22, 73/866.5; 340/620, 622
See application file for complete search history.

(56) References Cited

U.S. PATENT DOCUMENTS

| 4,298,143 | A | * | 11/1981 | Peterson ..................... 222/640 |
| 4,981,039 | A | * | 1/1991 | Hayashi et al. ............... 73/292 |
| 5,229,751 | A | * | 7/1993 | Chandler et al. ............. 340/618 |
| 5,923,257 | A | * | 7/1999 | Nolte .......................... 340/584 |
| 6,028,521 | A | * | 2/2000 | Issachar ....................... 340/624 |
| 6,062,126 | A | * | 5/2000 | Johnson et al. ............... 99/285 |
| 6,202,540 | B1 | * | 3/2001 | Johnson et al. ............... 99/285 |
| 6,223,596 | B1 | * | 5/2001 | Wilkins ........................ 73/305 |
| 6,741,180 | B2 | * | 5/2004 | Lassota ....................... 340/622 |
| 6,925,872 | B2 | * | 8/2005 | Hadala ......................... 73/295 |
| 7,000,468 | B2 | * | 2/2006 | Doorhy et al. ................ 73/301 |
| 7,022,946 | B2 | * | 4/2006 | Sanoner et al. ............. 219/387 |
| 7,161,361 | B2 | * | 1/2007 | Qu et al. ...................... 324/690 |
| 2003/0012256 | A1 | * | 1/2003 | Burkholder ................. 374/150 |
| 2005/0217369 | A1 | * | 10/2005 | Holappa et al. ........... 73/304 C |
| 2009/0031798 | A1 | * | 2/2009 | Radhakrishnan et al. .. 73/304 C |

FOREIGN PATENT DOCUMENTS

JP          3-10925         3/1991

* cited by examiner

*Primary Examiner*—John Fitzgerald
(74) *Attorney, Agent, or Firm*—Jordan and Hamburg LLP (57) ABSTRACT

Provided is a liquid container having an outer surface and an interior container from which the level of liquid in the container is not visible; the liquid container having a detecting unit having a liquid amount detecting means and a liquid temperature detecting means which are inserted into the inner container and detect a liquid amount and a liquid temperature. A unit outer package located on the outer surface of the container displays the liquid amount and the liquid temperature detected by the detecting means. All detecting and display components are included in a single unit.

1 Claim, 7 Drawing Sheets

PRIOR ART

LIQUID CONTAINER

BACKGROUND OF THE INVENTION

1. Field of the Invention

The present invention relates to a liquid container where a liquid temperature and a liquid amount in a single bottle, a double bottle or the like with a liquid surface thereinside being invisible can be checked from the outside.

2. Description of the Related Art

Figure 7:
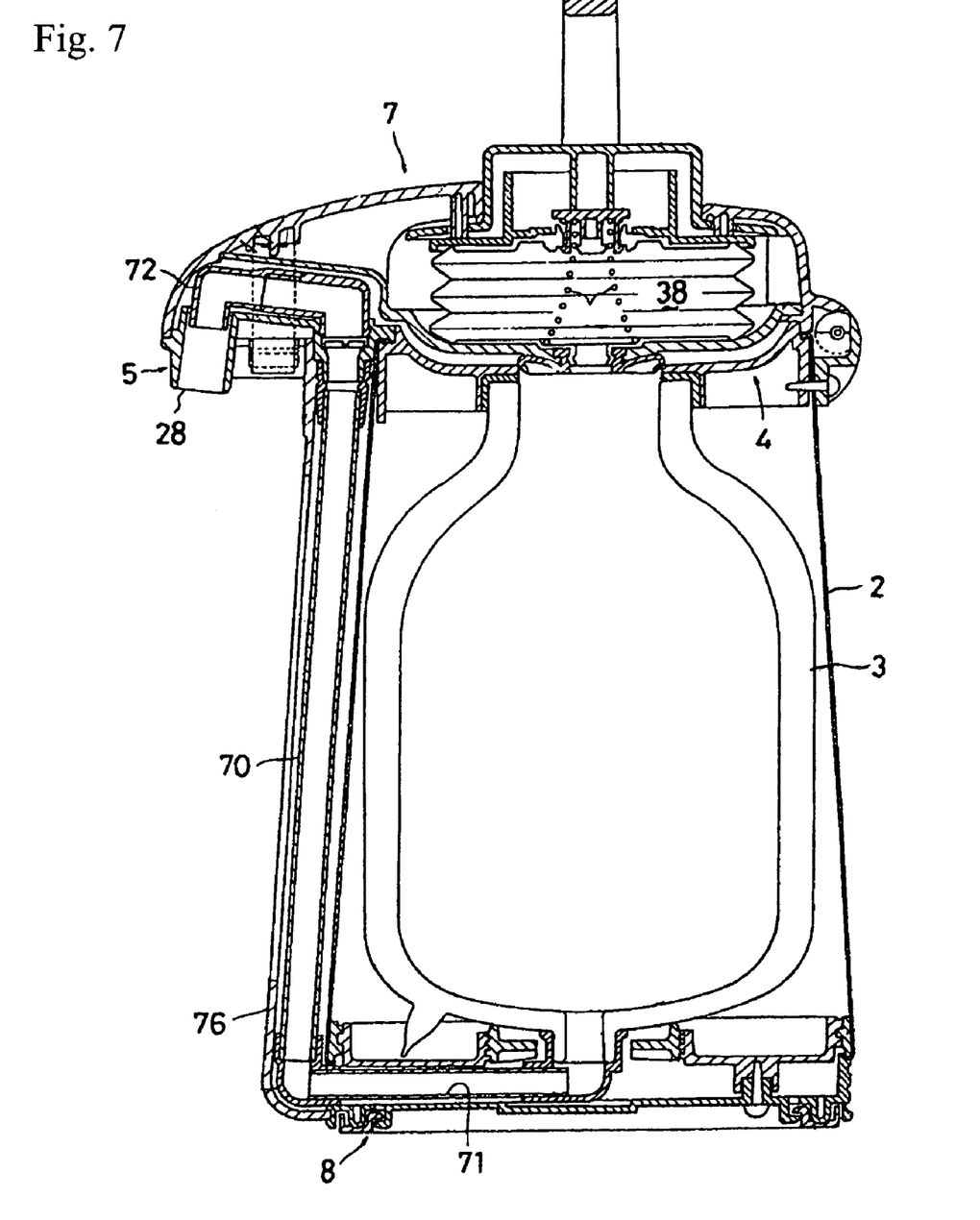
FIG. 7 is a view of the container prior art Japanese Utility Model Publication Hei 03-10925 in which numerals not discussed in the instant specification have been deleted.

Conventionally, in order to see a liquid amount inside a liquid container, such as a single bottle or especially a vacuum double bottle, with a liquid surface thereinside being invisible from the outside, a liquid container has been structured for example such that a narrow opening is provided at the bottom of the vacuum double bottle along with a top opening as a structure of the vacuum double bottle, and a lifting pump erected on a front surface of the liquid container at the narrow opening through a communicating pipe is provided in a manner visible from the front surface of the liquid container and is communicated with the inside of the liquid container, so that the liquid surface is visible from the outside to enable checking of the liquid amount. An example of the liquid container structured as above may include a pot that was described in Japanese Utility Model Publication No. Hei 3-10925, see FIG. 1, and has hence been known.

In the following, the conventional liquid container is described with reference to FIG. 1 of Japanese Utility Model Publication No. Hei 03-10925.

The pot as an example of the liquid container of Japanese Utility Model Publication No. Hei 03-10925 is provided with an inner bottle 3 as a vacuum double bottle surrounded by an outer package case 2 and having a top wide opening and a bottom narrow opening, equipped with a draining member 4 and a bottom member 8 respectively at the top and the bottom of the outer package case 2 surrounding the inner bottle 3, provided with a snout member 5 protruding forward in front of the shoulder member 4 and having a hollow in its lower portion, provided with a reception section having an opening communicated with the top wide opening of the inner bottle 3 at the center of the draining member 4, and equipped with an upper lid case 7 installing a bellows pump 38 at the top of the draining member 4.

Further, a space section is provided between a front surface wall of the outer package case 2 and the inner bottle 3, a lifting pipe 70 is erected in this space section, the bottom of the lifting pipe 70 is communicated with the narrow opening of the inner bottle 3 through a communication pipe 71, a discharge pipe 72 communicated to a liquid discharge port 28 of the snout member 5 at the top of the lifting pipe, and further a cover body 76 having a transparent portion is mounted on a front surface of the lifting pipe 70, so that the lifting pipe is visible through the transparent portion of the cover body 76 from the front surface.

By pressing the bellows pump 38 of the upper lid case 7, a liquid inside the inner bottle 3 is discharged from the narrow opening to the outside sequentially through the communication pipe 71, the lifting pipe 70, and the discharge pipe 72, and further, the lifting pipe communicated with the inside of the inner bottle 3 is viewed from the front surface, to check the liquid surface inside the lifting pipe on the same level as the liquid surface inside the inner bottle 3.

However, in this kind of liquid container, the liquid surface inside the inner bottle can be checked just by the presence of the lifting pipe that is erected on the front portion of the inner bottle while being communicated with the inner bottle. Hence there has been a problem in that in a liquid container especially such as a vacuum double bottle, having a structure where only a top opening is formed and a lifting pipe communicated with an inner bottle cannot be provided, it is totally not possible to see a liquid surface, namely a liquid amount, inside the inner bottle.

There has further been a problem in that, as in the case of the liquid surface, namely the liquid amount, it is also not possible to see whether a liquid temperature inside the inner bottle, especially the vacuum double bottle, is held at a desired temperature.

SUMMARY OF THE INVENTION

Accordingly, a liquid container was developed where a liquid amount and a liquid temperature inside an inner bottle can be checked from the outside even in the case of the vacuum double bottle as described above where a condition inside the inner bottle cannot be checked from the outside, and therefore, an object of the present invention is to provide the developed liquid container.

A liquid container according to the present invention implemented for achieving the above object is mainly configured to include: an inner container 2 which houses a liquid; a shoulder member 4 which is a member mounted on the upper portion of this inner container 2 and has a handle 3 and a spout 14 on the opposite side thereto; and a lid 5 which is removably placed at the top of this shoulder member 4 and opens/closes a top opening of the inner container 2, wherein the liquid container 1 where a liquid amount inside the inner container 2 is invisible from the outside is provided with a detecting unit 6 having a liquid amount detecting means 21 and a liquid temperature detecting means 22 which are inserted into the inner container 2 and detect a liquid amount and a liquid temperature, and a unit outer package 25 which displays on an outer surface of the liquid container 1 the liquid amount and the liquid temperature detected by the detecting means 21 and 22.

Further, the detecting unit 6 is configured to have: a liquid amount detecting means 21 of detecting a liquid amount; a liquid temperature detecting means 22 of detecting a liquid temperature; an energization controlling means 18 of controlling energization of these liquid amount detecting means and liquid temperature detecting means; a liquid amount displaying means 16 of displaying the liquid amount detected by the liquid amount detecting means on a plurality of scales; a liquid temperature displaying means 17 of displaying the liquid temperature detected by the liquid temperature detecting means on a plurality of scales; a main control substrate 7 which controls these means by microcomputer; a power source 8 which is an activation source of this main control substrate; and a display board 9 which displays with liquid crystal the displays of the liquid amount displaying means and the liquid temperature displaying means.

Moreover, the detecting unit 6 is configured to be provided integrally with: a hanging cylindrical body section 26 which houses a liquid amount detecting section of the liquid amount detecting means 21 and a liquid temperature detecting section of the liquid temperature detecting means 22 and is hung inside the inner container 2; a controller section 33 which houses the main control substrate 7, the power source 8 and the display board 9, and is protruded to the outer surface of the liquid container; and a coupling hollow section 34 which couples the hanging cylindrical body section 26 and the controller section 33, and removably placed on the shoulder member 4 as part of the shoulder member.

The present invention targeted at a liquid container where a liquid amount inside an inner container is invisible from the outside is configured to display on the outer surface of the liquid container a detecting unit having a liquid amount detecting means and a liquid temperature detecting means which are inserted into the inner container and detect a liquid amount and liquid temperature, and a unit outer package which displays the liquid amount and the liquid temperature detected by the detecting means. Therefore, even when the liquid container is one such as a vacuum double bottle where a condition inside the inner bottle is invisible from the outside, the present invention has a significant effect that the liquid amount and the liquid temperature inside the inner bottle can be checked from the outside of the liquid container with a simple structure.

BRIEF DESCRIPTION OF THE DRAWINGS

The remaining numerals in FIG. 7 are the same as those in FIG. 1 of the prior art Utility Model. The numbering of elements in FIG. 7 does not correspond with the numbering of elements in the Figures depicting embodiments of the instant invention.

DETAILED DESCRIPTION OF THE PREFERRED EMBODIMENTS

Figure 1:
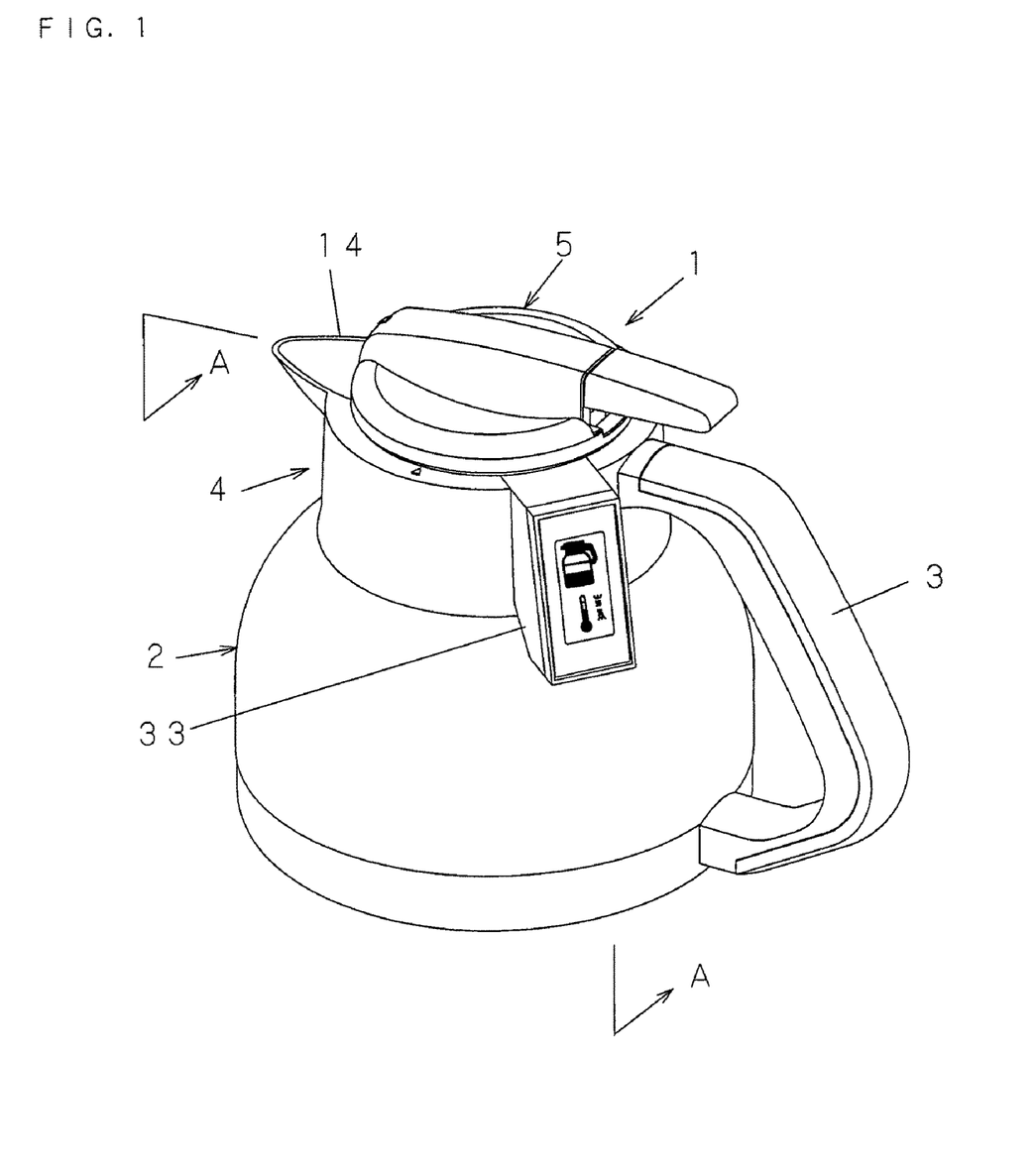
FIG. 1 is an oblique view of an example of the present invention.
Figure 2:
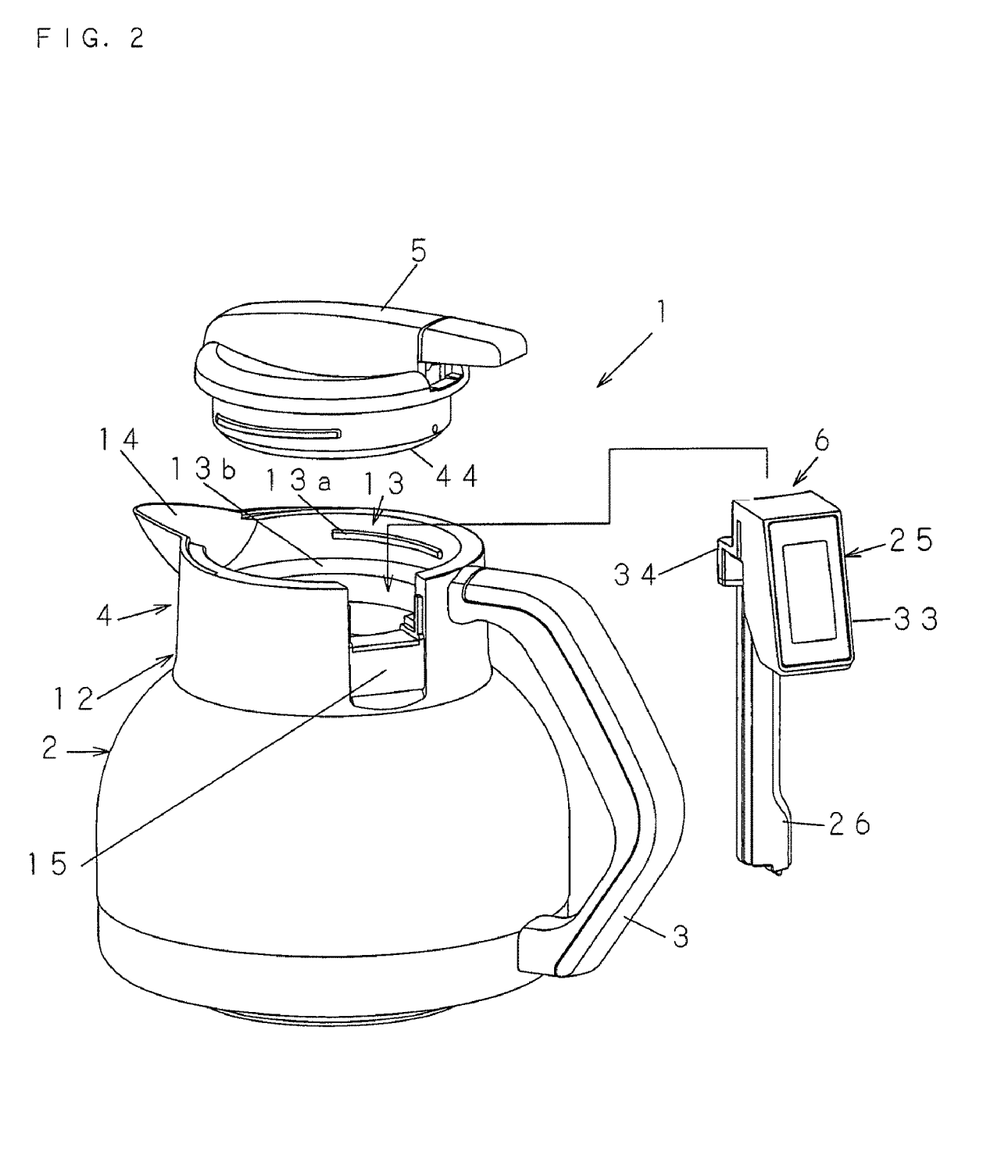
FIG. 2 is an exploded oblique view of the example of the present invention.
Figure 3:
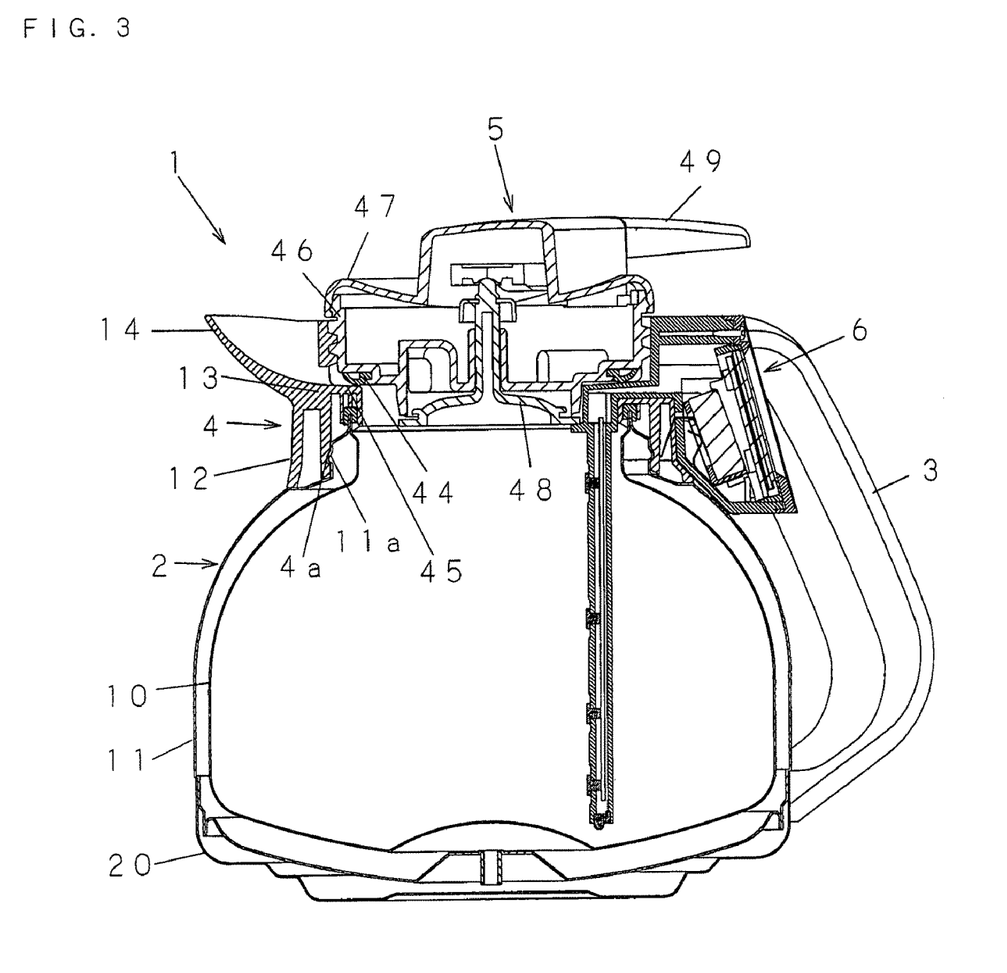
FIG. 3 is a vertical sectional view cut on A-A of the example of the present invention.

As shown in FIGS. 1 to 3, the liquid container 1 represents a desktop pot, and is configured such that an inner container 2 which also serves as a liquid container body is provided, a shoulder member 4 integrally provided with a handle 3 on its top rear side is placed at the top of the inner container 2, a lid 5 which opens and closes a top opening of the inner container 2 is removably placed at the top center of the shoulder member 4, and a detecting unit 6 which detects and displays a liquid amount and a liquid temperature inside the inner container is provided.

As shown in FIG. 3, the inner container 2 is a vacuum double bottle made of a metal material such as stainless with a space between an inner wall 10 and an outer wall 11 evacuated. The inner container 2 also serves as a liquid container body, and the bottom of this liquid container body is covered by a bottom wall 20 made of a homogeneous material with the outer wall 11.

This inner container 2 is structured such that a liquid surface inside the inner container is invisible from the outside except for the top opening.

The inner container 2 is provided with the bottomed inner wall 10 obtained by extending a peripheral wall that forms a circular top opening, and the bottomed outer wall 11 obtained by surrounding a periphery of this inner wall 10 with a spacing, forming a step portion, and superposing and welding its head onto the outer side of a peripheral wall that forms the top opening of the inner wall. A screw 11a for the shoulder member is cut on the outside of the step portion of the outer wall 11.

As shown in FIGS. 2 and 3, the shoulder member 4 is integrally provided with: a double-wall shoulder section 12 made up of an inner wall having in the inside thereof a screw portion 4a to be screwed into the screw 11a for the shoulder member of the inner container 2 and an outer wall spaced from the inner wall in the outside of the inner wall; a reception section 13 that extends as a single wall upward from the top of the shoulder section 12 and has a hollow from the center downward; a spout 14 that passes over the shoulder section 12 in front of the reception section 13 and extends outward to be communicated with the center of the reception section; and the handle 3 extends outward on a large scale backwardly from the double-wall shoulder portion at the back of the reception section 13.

As shown in FIG. 2, in the reception section 13 of the shoulder member 4, a female screw 13a is cut with which a later described lid 5 is screwed inside the peripheral wall forming the center hollow, and a flat surface 13b which abuts against a later-described seal packing 44 of the lid is provided under the side wall having the female screw 13a.

In a place close to the handle 3 in the reception section 13 and the shoulder section 12 of the shoulder member 4, a notched section 15 is provided for placement of a later-described detecting unit 6.

This notch section 15 may be provided in the upper portion of the handle 3 from the shoulder section 12 so that the controller section 33 of a later-described detecting unit 6 may be placed in the upper portion of the handle 3.

The lid 5 has: a lower lid 46 including a male screw 46a to be screwed into the female screw 13a for the lid of the reception section 13; an upper lid 47 which closes the top of the lower lid; and a lever 49 which moves up/down the valve body 48 from the outside of the upper lid. The lid 5 is structured such that a liquid inside the inner container 2 is released from the flat surface 13b of the reception section 13 around the valve body 48 by the operation of the lever 49 and poured from the spout 14 to the outside through a liquid passage within the inner container 2. Reference numeral 44 denotes a seal packing which abuts against the flat surface 13b of the reception section 13 to prevent the liquid inside the inner container 2 from flowing outside.

The detecting unit 6 is housed in a single detecting unit outer package 25, and has: the liquid amount detecting means 21 of detecting a liquid amount in the inner container; the liquid temperature detecting means 22 of detecting a liquid temperature in the inner container; the energization controlling means 18 of controlling energization of both of these means 22 and 21; the liquid amount displaying means 16 of displaying the liquid amount detected by the liquid amount detecting means 21 on a plurality of scales; the liquid temperature displaying means 17 of displaying the liquid temperature detected by the liquid temperature detecting means 22 on a plurality of scales; the main control substrate 7 which controls by microcomputer these means 22, 21, 18, 16, and 17; the power source 8 which is a battery, a storage cell or the like as a power source of this main control substrate; and the display board 9 which shows with liquid crystal the displays of the liquid amount displaying means 16 and the liquid temperature displaying means 17.

Figure 5:
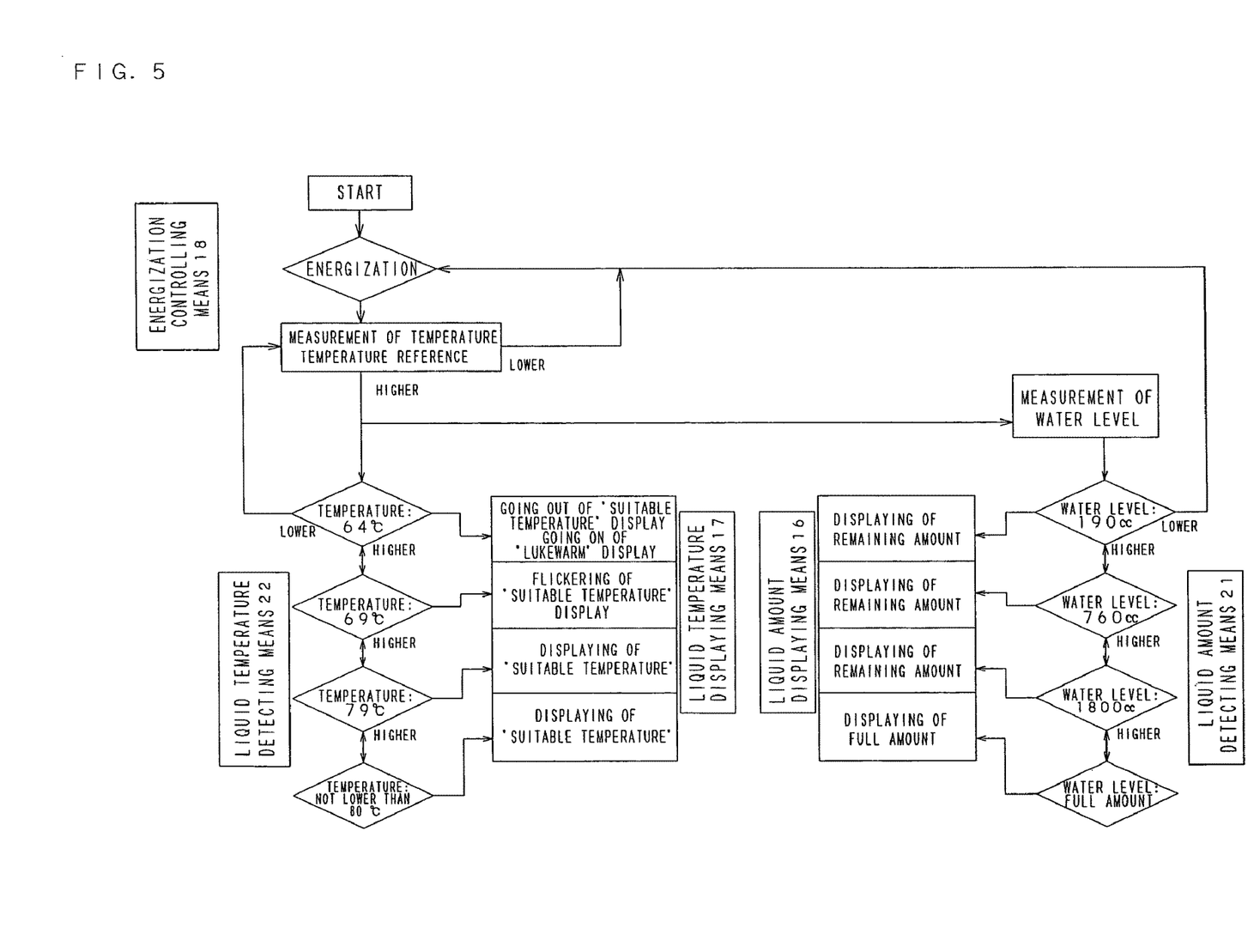
FIG. 5 is a flow chart for control in another example of the present invention.

As shown in FIG. 5, the detecting unit 6 is subjected to the energization controlling means 18 after start of the process and before activation of the liquid temperature detecting means 22 and the liquid amount detecting means 21. In this energization controlling means 18, a temperature is measured at every fixed time and a temperature suitable for drinking is determined as a reference, to set a temperature reference. Based upon this temperature reference, the liquid is led to the liquid temperature detecting means 22 and the liquid amount detecting means 21 when its temperature measured at every fixed time is high, and the liquid is not led to the liquid temperature detecting means 22 and the liquid amount detecting means 21 when its temperature measured is low. This energization controlling means 18 enables reduction in power consumption required for measurement by intermittently measuring the temperature, and also eliminates the need for the presence of a switch from the start.

The liquid temperature detecting means 22 of the detecting unit 6 measures a liquid temperature with a temperature sensor 31 having a temperature sensing element such as a thermistor or a thermocouple, and is arranged on the lower wall of the hanging cylindrical body section 26 of the later-described unit outer package 25. The wiring of the liquid temperature detecting means 22 is connected from the electrode substrate 23 inside the hanging cylindrical body section 26 to the main control substrate 7, and only a temperature not lower than the temperature reference is displayed with liquid crystal in stages on the display board 9.

The liquid amount detecting means 21 of the detecting unit 6 is provided with: a plurality of electrode elements 27, 27 at intervals as one of positive and negative electrodes on the outer wall of the hanging cylindrical body section 26 of the unit outer package 25; and an electrode element 28 as the other of the positive and negative electrodes on the lower wall of the hanging cylindrical body section 26. The liquid amount detecting means 21 detects an electric capacitance by electric energization of the electrode element 28 on the lower wall soaked in the liquid inside the inner container 2 and the top electrode element 27 soaked in the liquid, and performs measurement through the main control substrate 7 so that a liquid amount is displayed with liquid crystal in stages on the display board 9.

While the wiring among the electrode elements 27, 27 and 28 is connected to the main control substrate 7 by the electrode substrate 23 inside the hanging cylindrical body section 26, this electrode substrate 23 is insertion-molded inside the hanging cylindrical body section 26 along with the electrode elements 27, 27 and 28 except for the heads of the electrode elements 27, 27 and 28.

As thus described, since a temperature is intermittently measured by the energization controlling means 18, power consumption for measurement can be suppressed to the utmost. Further, a temperature suitable for drinking is previously determined as a reference value, and display of a temperature and measurement and display of a liquid amount are not performed when the liquid temperature is lower than the temperature reference, preventing wasteful power consumption to suppress battery exhaust so as to extend a battery life. Moreover, the user can judge that the liquid is not on a condition for drinking coffee, tea, and the like when the display is off. When the liquid temperature is higher than the temperature reference, the liquid temperature is displayed in stages, and the liquid amount is also displayed in stages.

It appears to be not user friendly that the presence of a power switch or a switch for display may cause turning on/off to be forgotten. However, since judgment is automatically made by temperature measurement at every fixed time, no switch is necessary when a liquid temperature and a liquid amount inside the inner container are wished to be seen from the outside of the liquid container, thereby generating no such a concern as thus described.

Figure 6:
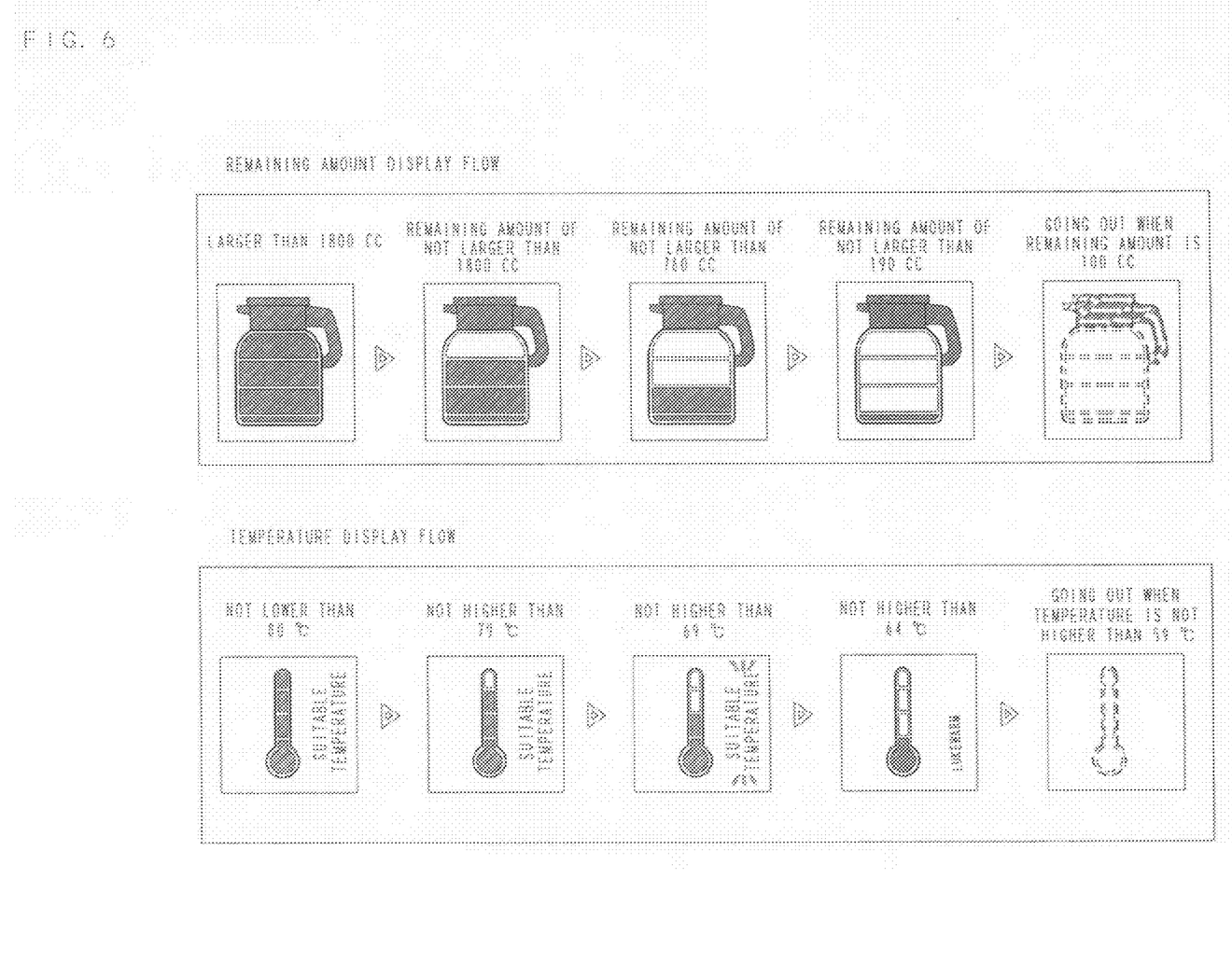
FIG. 6 is a flow chart for liquid crystal display in another example of the present invention.

As shown in FIG. 6, the liquid amount displaying means 16 makes display in stages by an increase/decrease in black portion shown in a silhouette of a liquid container. Assuming that a full amount is 1900 cc, 100 cc is set as a first reference of a water amount in such a manner that the silhouette of the liquid container goes out when the remaining amount inside the inner container is not larger than 100 cc, and the silhouette goes on when the remaining amount inside the inner container is not smaller than 100 cc. Hence a switch is not necessary for this going on/out.

Further, although the remaining amount inside the inner container is displayed in five stages of not larger than 190 cc, 760 cc, 1800 cc and not smaller than 1800 cc as a full amount, these five stages are not particularly limited, and three stages may be set, or eight stages may be set without any problem. Also in this switching in stages, there is no need for a switch like a sequentially switched switch.

As shown in FIG. 6, the liquid temperature displaying means 17 makes display in stages by an increase/decrease in black portion in a silhouette of a thermometer. A first reference is set in such a manner that the silhouette of the thermometer goes out when the temperature inside the inner container is not higher than 59° C., and the silhouette goes on when the temperature inside the inner container is not lower than 60° C. Hence a switch is not necessary for this going on/out.

Further, although the temperature inside the inner container is displayed in five stages of not higher than 64° C., 69° C. and 79° C. and not lower than 80° C., these five stages are not particularly limited, and three stages may be set, or eight stages may be set without any problem. Also in this switching in stages, there is no need for a switch like a sequentially switched switch.

Moreover, when the temperature inside the inner container is not lower than 60° C., the silhouette goes on. When the temperature is not higher than 64° C., "Lukewarm" is displayed simultaneously with going on of the silhouette. When the temperature is not higher than 69° C., display of "Suitable Temperature" flickers. When the temperature is not lower than 70° C., "Suitable Temperature" is simultaneously displayed. Therefore, the temperature display is highly easy to see, and can be checked in details.

Next, a control flow for a liquid amount and a liquid temperature is described with reference to FIG. 5.

Energization is performed by the energization controlling means 18 concurrently with the start of the process, and a temperature is measured and compared with the temperature reference. When the temperature is lower than the reference, the energization controlling means 18 does not activate the subsequent liquid temperature detecting means 22, the liquid temperature displaying means 17, the liquid amount detecting means 21 and the liquid amount displaying means 16. When the temperature is higher than the reference, the energization controlling means 18 activates the subsequent liquid temperature detecting means 22, the liquid temperature displaying means 17, the liquid amount detecting means 21 and the liquid amount displaying means 16.

When the liquid temperature is not higher than 59° C. according to the liquid temperature detecting means 22 and the liquid temperature displaying means 17, the silhouette of the thermometer goes out and the process returns to the start point. When the liquid temperature is not lower than 60° C., the temperature is judged to be higher than the reference and then compared with the next liquid temperature reference. When the liquid temperature is not higher than 64° C., "Lukewarm" is displayed simultaneously with going on of the silhouette. When the liquid temperature is not lower than 64° C., the temperature is judged to be higher than the reference and then compared with the next liquid temperature reference. This process is sequentially repeated, and the liquid temperature is displayed as the silhouette of the thermometer. With decrease in liquid temperature inside the liquid container, the reference returns to the corresponding one.

Similarly, when the liquid amount is not larger than 100 cc according to the liquid amount detecting means 21 and the liquid amount displaying means 16, the silhouette of the liquid container goes out showing that the amount is smaller than the reference, and the process returns to the start point. When the liquid amount is not smaller than 100 cc, the amount is judged to be larger than the reference and then compared with the next liquid amount reference. When the liquid amount is not larger than 190 cc, the silhouette of the liquid container is displayed so as to show that the amount is smaller than the reference. When the liquid amount is not smaller than 190 cc, the amount is judged to be larger than the reference and then compared with the next liquid amount reference. This process is sequentially repeated, and the liquid amount is displayed as the silhouette of the liquid container. Associated with the use of water inside the liquid container, the reference returns to the corresponding one.

The main control substrate 7 controls by an electronic circuit mechanism of microcomputer the electric system of the energization controlling means 18, the liquid temperature detecting means 22, the liquid temperature displaying means 17, the liquid amount detecting means 21, the liquid amount displaying means 16 and the display board 9 for displaying with liquid crystal a liquid temperature and a liquid amount, and data from the means and the like are processed so that the liquid temperature and the liquid amount is displayed with liquid crystal on a surface of the display board 9. LCD display is applied to this display board 9.

The unit outer package 25 is integrally provided with the hanging cylindrical body section 26 which is hung inside the inner container 2, the controller section 33 which protrudes from the shoulder section 12 in a position close to the handle 3, and the coupling hollow section 34 which couples the hanging cylindrical body section 26 and the controller 33, and is located in the notched section 15 of the reception section 13.

As described above, the hanging cylindrical body section 26 has the plurality of electrode element 27, 27 on the outer wall, and the electrode element 28 and the temperature detector 31 on the lower wall, and each wiring passes through the hanging cylindrical body section through the electrode substrate 23.

Figure 4:
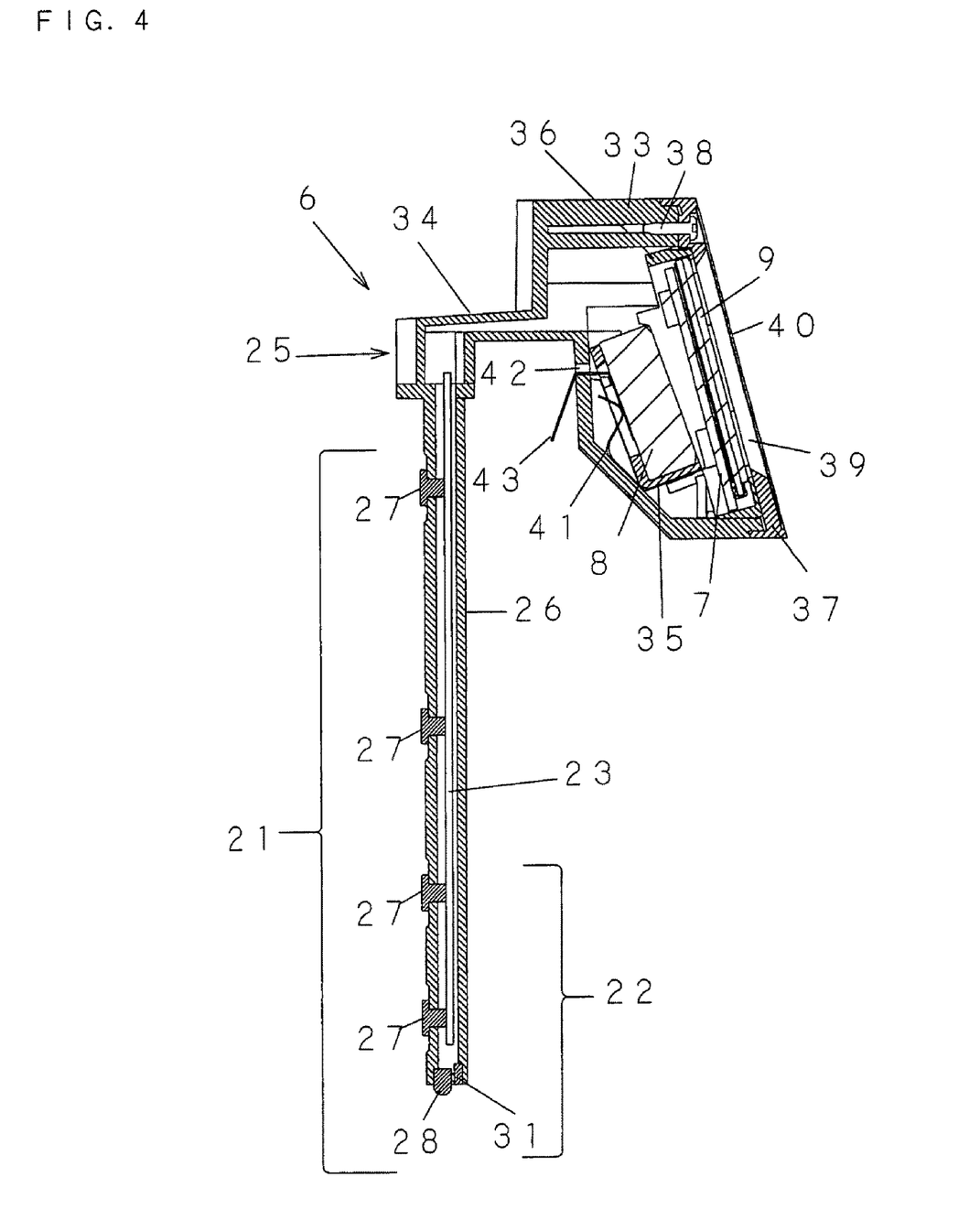
FIG. 4 is a vertical sectional view of a detecting unit in another example of the present invention; A3

As shown in FIG. 4, the power source 8 is arranged in the recesses of the controller section 33 along with a power source cover 35, and the main control substrate 7 and the display board 9 are arranged on the power source 8 along with a control substrate cover 36. A fixing board 37 covering the control substrate cover is fixed with a screw 38. A transparent board 39 is arranged inside the center hollow section of the fixed board, and the transparent seal 40 is put so as to cover the transparent board. A terminal board 41 made of a thin metal plate communicating the terminal side in the recesses of the power source 8 and the terminal side of the main control substrate 7.

Numeral 42 denotes a seal pull-out hole.

At the time of manufacturing and assembly of the liquid container 1, a shield seal 43 that can be pulled out is arranged between the terminal side in the recesses of the power source 8 and the terminal board 41 communicated with the main control substrate 7, to block energization of the power source 8 and the main control substrate 7.

The head of this shield seal 43 is projected from the seal pulling hole 42 of the controller section 33 at the time of manufacturing and assembly of the liquid container 1, and when the shield seal is pulled out, the terminal side of the power source 8 and the terminal board 41 connect with each other, to energize the main control substrate 7.

As another method for making the power source and the main control substrate energizeable, a structure where both are energized semipermanently once a switch in small rod shape provided on the power source side is pressed, or a structure where a magnet is brought close to a switch on the power source side to turn on the switch.

As shown in FIG. 2, the coupling hollow section 34 of the unit outer package 25 is removably placed in the notched section 15 of the reception section 13, and forms one face with a flat surface 45 of the reception section 13 in contact with the seal packing 44 of the lid 5.

Although the examples considered as typical examples of the present invention were described, the present invention is not limited to the structures of these examples. For example, an alteration can be appropriately made to the present invention within a range including the above constitutional requirements for the present invention, achieving the object of the present invention, and having the effect of the present invention, such as a desktop thermos obtained by surrounding a container body by an outer package case.

What is claimed is:

1. A liquid container, comprising:
    an inner container which houses a liquid;
    a shoulder member which is a member mounted on an upper portion of this inner container and has a handle and a spout on the opposite side thereto; and
    a lid which is removably placed at a top of this shoulder member and opens/closes a top opening of the inner container,
    a liquid amount detecting means and a liquid temperature detecting means for detecting a liquid amount and a liquid temperature of the inner container, respectively;
    a liquid amount displaying means and a liquid temperature displaying means for displaying on a display board the liquid amount and the liquid temperature detected by the respective detecting means;
    a main control substrate which controls the liquid amount detecting means, the liquid temperature detecting means, the liquid temperature displaying means, and the liquid amount displaying means;
    a power source which is an activation source of the main control substrate;
    a detecting unit; and
    a unit outer package housing the main control substrate, the power source, the liquid amount detecting means, the liquid amount displaying means, the liquid temperature detecting means, the liquid temperature displaying means; wherein
    the unit outer package of the detecting unit is provided integrally with a hanging cylindrical body section which houses a liquid amount detecting section of the liquid amount detecting means and a liquid temperature detecting section of the liquid temperature detecting means and is hung inside the inner container; a controller section which houses the main control substrate, the power source, and the display board, and is protruded to the outer surface of the liquid container; a coupling hollow section which couples the hanging cylindrical body section and the controller section; and further wherein
    the detecting unit is removably placed on the shoulder member as part of the shoulder member.

* * * * *